US012400785B2

(12) United States Patent
Oide et al.

(10) Patent No.: US 12,400,785 B2
(45) Date of Patent: Aug. 26, 2025

(54) MULTI-LAYER COIL COMPONENT

(71) Applicant: TDK CORPORATION, Tokyo (JP)

(72) Inventors: Akihiko Oide, Tokyo (JP); Makoto Yoshino, Tokyo (JP); Tomoki Okada, Yurihonjo (JP); Hideki Saitou, Yurihonjo (JP); Seiji Osada, Yurihonjo (JP); Kazuhiro Ebina, Tokyo (JP); Kunio Oda, Tokyo (JP); Takashi Abe, Yurihonjo (JP); Akio Shibata, Tokyo (JP); Kazuo Iwai, Tokyo (JP)

(73) Assignee: TDK CORPORATION, Tokyo (JP)

( * ) Notice: Subject to any disclaimer, the term of this patent is extended or adjusted under 35 U.S.C. 154(b) by 756 days.

(21) Appl. No.: 17/698,561

(22) Filed: Mar. 18, 2022

(65) Prior Publication Data

US 2022/0310312 A1 Sep. 29, 2022

(30) Foreign Application Priority Data

Mar. 24, 2021 (JP) ................................ 2021-049717

(51) Int. Cl.
*H01F 27/29* (2006.01)
*H01F 27/28* (2006.01)

(52) U.S. Cl.
CPC ....... *H01F 27/292* (2013.01); *H01F 27/2804* (2013.01); *H01F 2027/2809* (2013.01)

(58) Field of Classification Search
CPC ............... H01F 27/292; H01F 27/2804; H01F 2027/2809
See application file for complete search history.

(56) References Cited

U.S. PATENT DOCUMENTS

2017/0025220 A1 1/2017 Nakaniwa
2019/0304667 A1* 10/2019 Hirukawa ............ H01F 27/292
2020/0118737 A1* 4/2020 Suzuki .................... H01F 1/344
2020/0135375 A1 4/2020 Sato et al.

FOREIGN PATENT DOCUMENTS

JP H11297531 A * 10/1999
JP 2003-031423 A 1/2003
JP 2003243230 A * 8/2003
JP 2020-061522 A 4/2020
WO 2015/156051 A1 10/2015

* cited by examiner

*Primary Examiner* — Malcolm Barnes
(74) *Attorney, Agent, or Firm* — Oliff PLC

(57) ABSTRACT

In the multi-layer coil component, the lead conductor is exposed from the end surface of the element body and is connected to the external electrode provided on the end surface. When the lead conductor is led out to the end surface of the element body, the lead area can be easily increased as compared with the case where the lead conductor is led out to the side surface of the element body. Therefore, by connecting the coil and the external electrode via the lead conductor, high connectivity between the coil and the external electrode is achieved.

4 Claims, 13 Drawing Sheets

MULTI-LAYER COIL COMPONENT

CROSS-REFERENCE TO RELATED APPLICATIONS

This application is based upon and claims the benefit of priority from Japanese Patent Application No. 2021-049717, filed on 24 Mar. 2021, the entire contents of which are incorporated herein by reference.

TECHNICAL FIELD

The present disclosure relates to a multi-layer coil component.

BACKGROUND

Conventionally, known in the art is a multi-layer coil component in which a coil having a coil axis parallel to a stacking direction is provided in an element body having a stacking structure. Japanese Patent Laid-Open No. 2003-31423 (Patent Document 1) discloses a technique of forming a conductor pattern constituting a coil by using a printing method.

SUMMARY

In the above-described multi-layer coil component according to the conventional art, as shown in FIGS. 12 and 13, coil patterns 21 and 22 constituting a coil 20 and a lead conductor 30A for leading out each of the end portions of the coil 20 to the side surface of an element body 12 (that is, the surface extending parallel to the stacking direction of the element body 12) are formed by a printing method. Therefore, the lead-out area of the coil 20 is substantially the same as the cross-sectional area of the conductor pattern constituting the lead conductor 30A.

The inventors of the present invention have repeatedly studied the lead-out area of the coil, and have newly found a technique of increasing the lead-out area of the coil to improve the connectivity between the coil and the external electrode.

According to various aspects of the present disclosure, there is provided a multi-layer coil component in which connectivity between a coil and an external electrode is improved.

A multi-layer coil component according to an aspect of the present disclosure comprising, a sintered element body including a plurality of stacked layers and having a pair of end surfaces facing each other in a first direction parallel to a stacking direction of the plurality of layers, a coil provided in the sintered element body and having a coil axis parallel to the first direction, a pair of external electrodes respectively provided on the end surfaces of the sintered element body; and, a pair of lead conductors each provided between the end portion of the coil and the end surface of the sintered element body, the pair of lead conductors being connected electrically to the end portions of the coil and exposed from the end surfaces of the sintered element body to connect to the external electrodes, wherein the lead conductor includes a plurality of lead layers each having a first end portion and a second end portion located closer to the end surface side than the first end portion and displaced from the first end portion when viewed from the first direction, the plurality of lead layers is overlapped in the first direction, and wherein, in the lead layers adjacent to each other in the first direction, the first end portion of one lead layer and the second end portion of the other lead layer overlap each other.

In the multi-layer coil component, the lead conductor connected to the end portion of the coil is exposed from the end surface of the sintered body and connected to the external electrode provided on the end surface. In the case where the lead conductor is led out to the end surface of the sintered element body, the lead area can be easily increased as compared with the case where the lead conductor is led out to the side surface of the element body, and high connectivity between the coil and the external electrode can be achieved.

In the multi-layer coil component according to another aspect, each of the plurality of lead layers has an I-shape when viewed from the first direction, the plurality of lead layers is overlapped in a zigzag manner.

In the multi-layer coil component according to another aspect, a length of the lead conductor in the first direction is 5% or more of a length of the sintered element body in the first direction and is equal to or less than an inner diameter of the coil.

In the multi-layer coil component according to another aspect, the lead conductor includes a first lead layer exposed at the end surface of the sintered element body and a second lead layer overlapping the first lead layer on the coil side, and an area of the first lead layer when viewed from the first direction is larger than an area of the second lead layer.

In the multi-layer coil component according to another aspect, the sintered element body has a print stacking structure.

DETAILED DESCRIPTION

Figure 1:
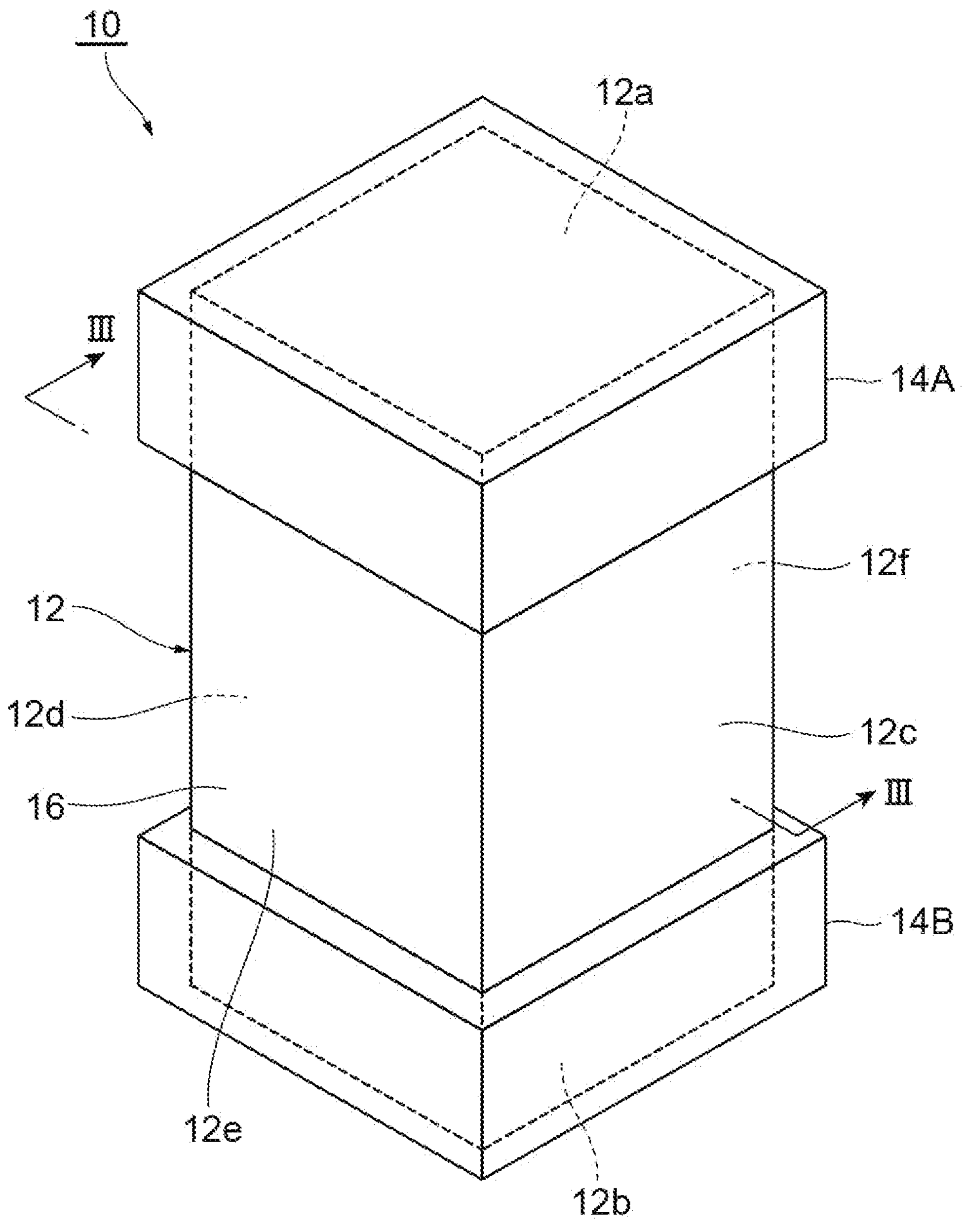
FIG. 1 is a perspective view showing a multi-layer coil component according to an embodiment.

Hereinafter, embodiments of the present disclosure will be described with reference to the accompanying drawings. In the description of the drawings, the same or equivalent element is denoted by the same reference numeral, and redundant description is omitted.

Figure 2:
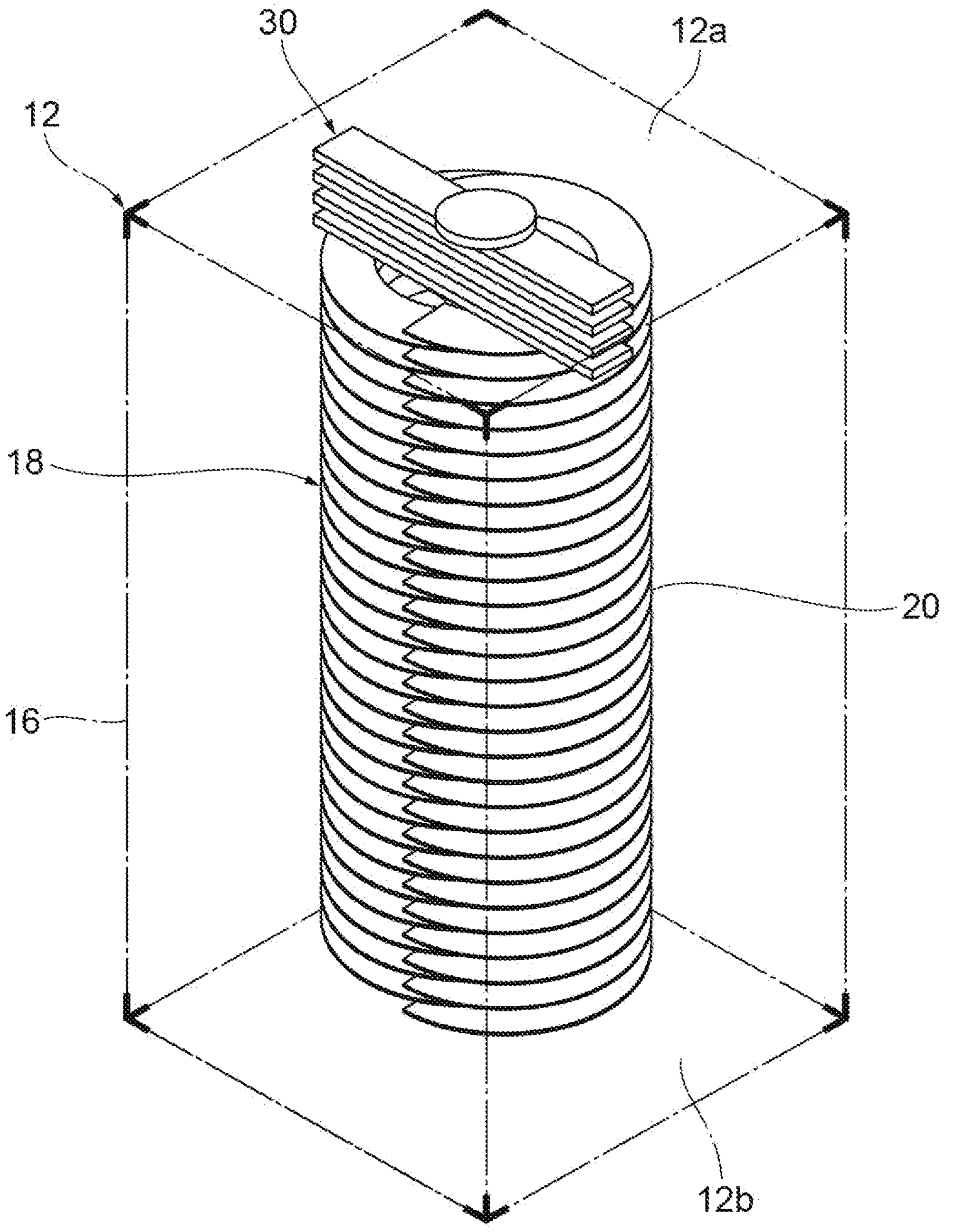
FIG. 2 is a perspective view showing an inner conductor of the element body shown in FIG. 1.

A structure of a multi-layer coil component according to an embodiment will be described with reference to FIGS. 1 to 3. As shown in FIG. 1, the multi-layer coil component 10 according to the embodiment includes an element body 12 (sintered element body) and a pair of external electrodes 14A and 14B.

The element body 12 has a substantially rectangular parallelepiped outer shape and includes a pair of end surfaces 12*a* and 12*b* facing each other in the extending direction of the element body 12. The element body 12 further includes four side surfaces 12*c* to 12*f* extending in the direction in which the end surfaces 12*a* and 12*b* face each other and connecting the end surfaces 12*a* and 12*b* to each other. In the present embodiment, the side surface 12*d* is a mounting surface facing the mounting base when the multi-layer coil component 10 is mounted, and the side surface 12*c* facing the side surface 12*d* is a top surface when the multi-layer coil component 10 is mounted. When the dimension of the element body 12 in the facing direction of the end surfaces 12*a* and 12*b* is a length, the dimension in the facing direction of the side surfaces 12*e* and 12*f* is a width, and the dimension in the facing direction of the side surfaces 12*c* and 12*d* is a thickness, the dimension of the element body 12 is, for example, 1.6 mm length×0.8 mm width×0.8 mm thickness.

The pair of external electrodes 14A and 14B are provided on the end surfaces 12*a* and 12*b* of the element body 12, respectively. In the present embodiment, the external electrode 14A integrally covers the entire region of the end surface 12*a* and the side surfaces 12*c* to 12*f* of the region adjacent to the end surface 12*a*. Similarly, the external electrode 14B integrally covers the entire region of the end surface 12*b* and the side surfaces 12*c* to 12*f* of the region adjacent to the end surface 12*b*. Each of the external electrodes 14A and 14B includes one or more electrode layers. For example, a metallic material such as Ag may be used as an electrode material constituting each of the external electrodes 14A and 14B.

The element body 12 has a structure in which an internal conductor 18 is provided inside a magnetic body 16. The element body 12 has a stacking structure. The magnetic body 16 has a stacking structure in which a plurality of magnetic layers 16L and 16R described later are stacked in the direction in which the end surfaces 12*a* and 12*b* face each other. In the following description, the facing direction of the end surfaces 12*a* and 12*b* is also referred to as a stacking direction or a first direction of the element body 12.

The magnetic body 16 is made of a magnetic material such as ferrite. The magnetic body 16 is obtained by stacking and sintering a plurality of magnetic pastes (for example, ferrite pastes) to be the magnetic body layers 16L and 16R. That is, the element body 12 has a print stacking structure and is a sintered element body, in which the magnetic layers 16L and 16R on which the magnetic paste is printed are stacked and sintered. The number of magnetic layers 16L and 16R constituting the element body 12 is, for example, 30 layers. The thickness of each of the magnetic layers 16L and 16R is, for example, 30 μm. In the actual element body 12, the plurality of magnetic layers 16L and 16R are integrated such that boundaries between the layers are not visible.

The inner conductor 18 includes one coil 20 and a pair of lead conductors 30. Each of the coil 20 and the lead conductor 30 of the inner conductor 18 has a stacking structure in the stacking direction of the element body 12. As shown in FIG. 2, in the present embodiment, the coil 20 has a cylindrical outer shape.

Figure 3:
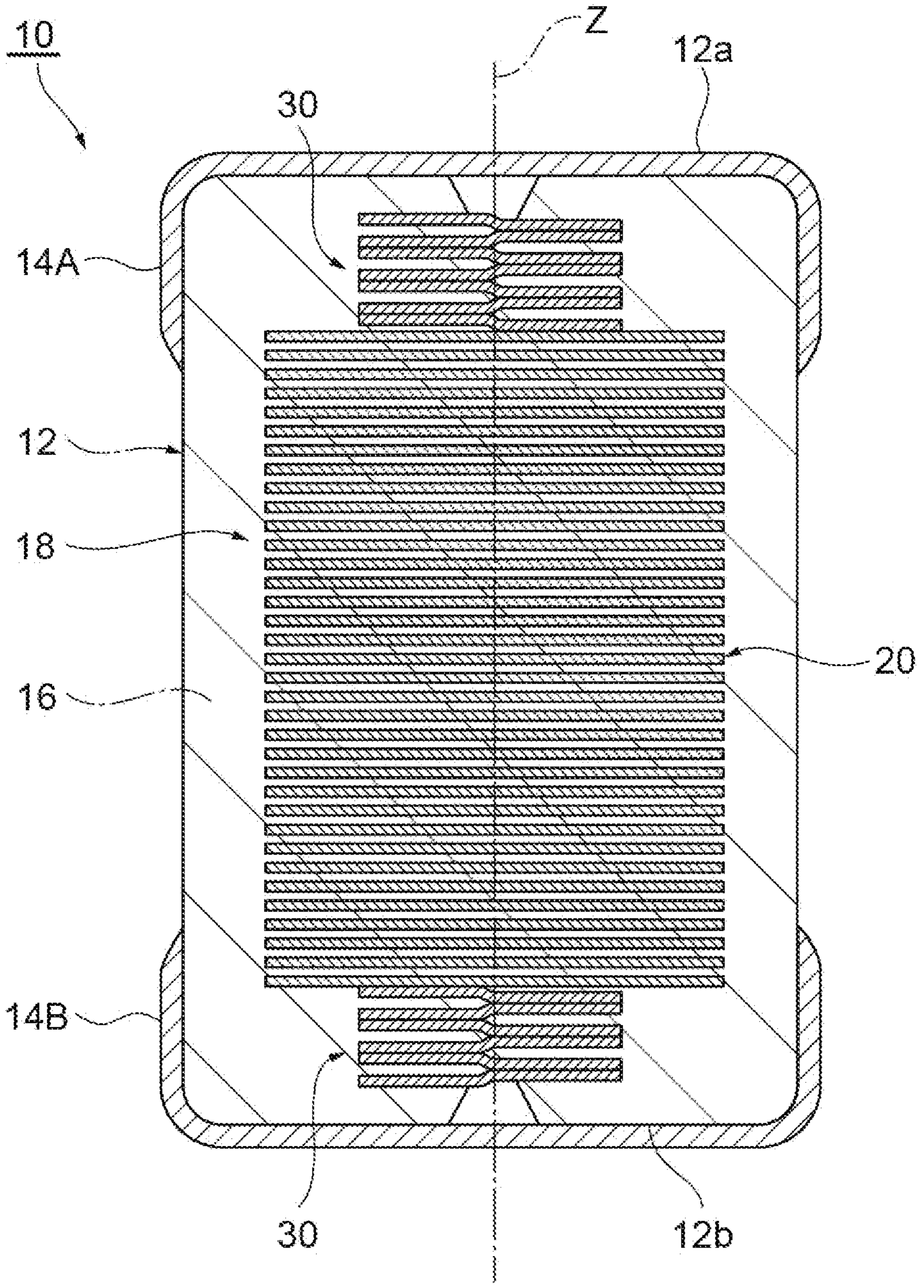
FIG. 3 is a cross-sectional view taken along line III-III of the multi-layer coil component shown in FIG. 1.

As shown in FIG. 3, the coil 20 has a coil axis Z parallel to the stacking direction of the element body 12 and is wound around the coil axis Z. In the present embodiment, the length of the coil 20 in the stacking direction of the element body 12 is 1.3 mm. In the stacking direction of the element body 12, the length of the coil 20 can be designed to be in a range of 50 to 90% of the length of the element body 12. In the present embodiment, the inner diameter of the coil 20 is 0.20 to 0.40 mm, for example, 0.35 mm.

The coil 20 includes a plurality of coil layers 21 and 22. The coil layers 21 and 22 constituting the coil 20 are made of a conductive material containing a metal such as Ag. The coil 20 is formed by a printing method. Specifically, the coil 20 is obtained by applying a conductive paste (for example, Ag paste) to be the coil layers 21 and 22 on a magnetic paste to be the magnetic layers 16L and 16R and sintering the conductive paste. The thickness of each of the coil layers 21 and 22 is, for example, 20 μm.

Figure 4:
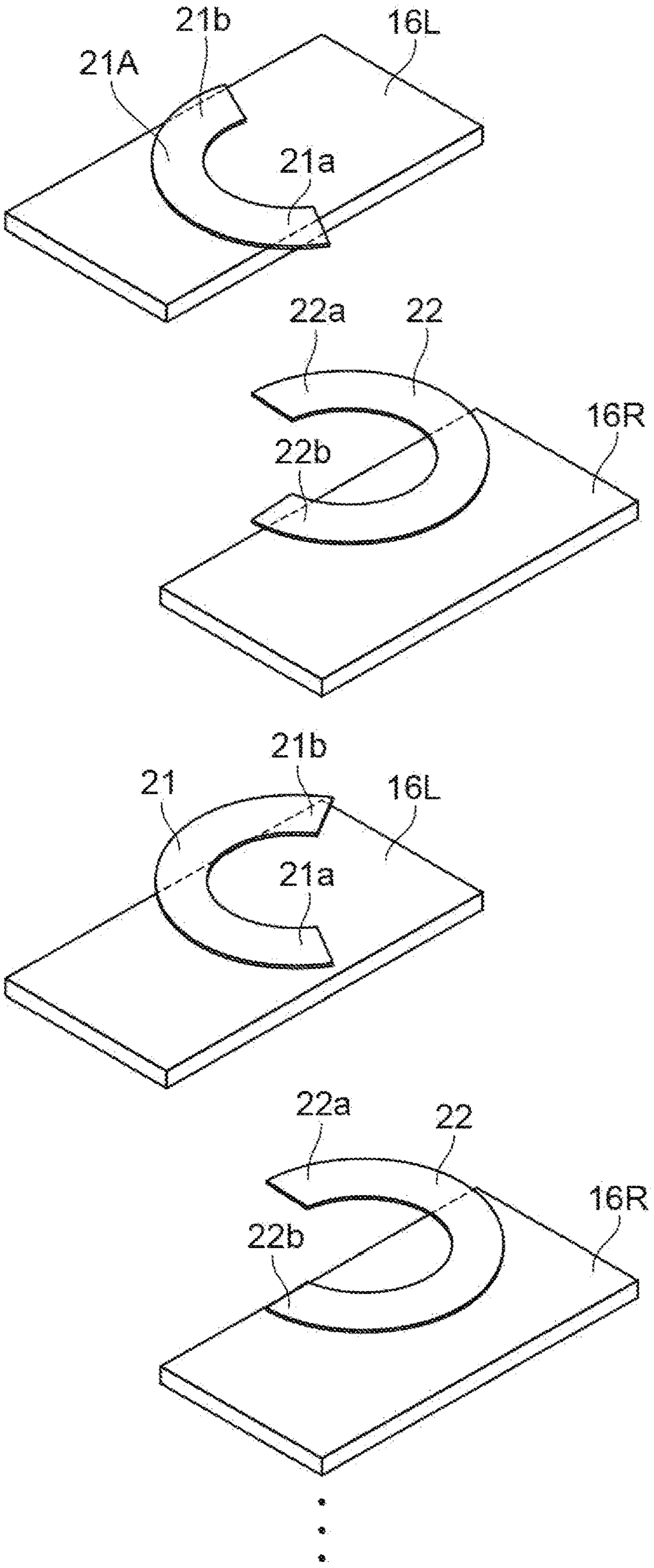
FIG. 4 is a perspective view showing a stacking structure of the coils shown in FIGS. 2 and 3.

FIG. 4 is an exploded perspective view showing the stacking structure of the portion of the coil 20 of the element body 12. As shown in FIG. 4, in the portion of the coil 20 of the inner conductor 18, the coil layers 21 and 22 constituting the coil 20 and the magnetic layers 16L and 16R constituting the element body 12 are alternately stacked.

Each of the coil layers 21 and 22 has a C-shape (or a U-shape) when viewed from the stacking direction of the element body 12. When viewed from the stacking direction of the element body 12, the coil layer 21 and the coil layer 22 have a relationship of point symmetry or rotational symmetry with respect to the coil axis Z. The coil layer 21 and the coil layer 22 constitute ¾ turns of the coil 20. The coil layers 21 and the coil layers 22 are alternately arranged in the stacking direction of the element body 12. The coil layer 21 and the coil layer 22, which are adjacent to each other in the stacking direction of the element body 12, are joined to each other with their end portions overlapping each other, and constitute one turn of the coil 20 surrounding the coil axis Z.

FIGS. 5A to 5D and 6A to 6D are views showing a procedure for forming the coil 20 by the printing method.

Figure 5A:
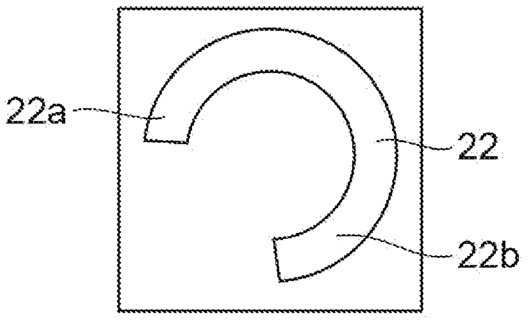
FIGS. 5A to 5D are views showing each step in manufacturing the coil shown in FIG. 4.

As shown in FIG. 5A, first, the conductive paste for forming the coil layer 22 is printed on the magnetic layer served as a base. The coil layer 22 has a first end portion 22*a* on the upper side of the left half surface and a second end portion 22*b* on the lower side of the right half surface.

Figure 5B:
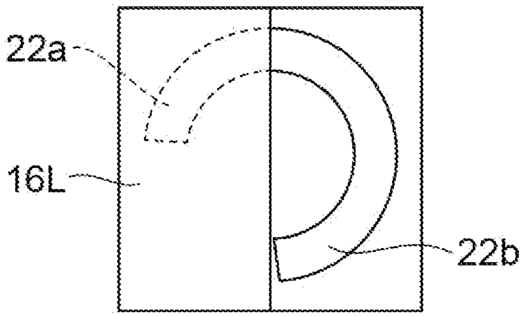

Next, as shown in FIG. 5B, the magnetic paste for forming the magnetic layer 16L is printed on the left half surface. Accordingly, only the first end portion 22*a* of the end portions 22*a* and 22*b* of the coil layer 22 is covered with the magnetic paste.

Figure 5C:
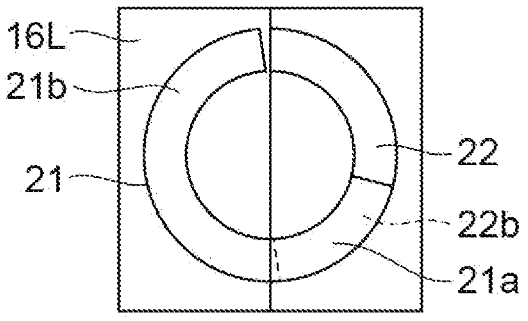

Then, as shown in FIG. 5C, the conductive paste to be the coil layer 21 is printed. The coil layer 21 has a first end portion 21*a* on the lower side of the right half surface and a second end portion 21*b* on the upper side of the left half surface. The first end portion 21*a* of the coil layer 21 located on the right half surface overlaps and is joined to the second end portion 22*b* of the coil layer 22 exposed from the magnetic layer 16L. The second end portion 21*b* of the coil layer 21 located on the left half surface is provided on the magnetic layer 16L. Therefore, the first end portion 21*a* and the second end portion 21*b* of the coil layer 21 are at different height positions in the stacking direction of the element body 12. More specifically, the second end portion

21*b* is located closer to the end surface 12*a* (closer to the viewer of FIGS. 5A to 5D) than the first end portion 21*a*.

Figure 5D:
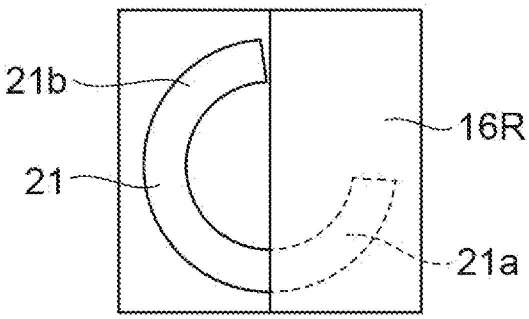

Further, as shown in FIG. 5D, the magnetic paste to be the magnetic layer 16R is printed on the right half surface. Accordingly, only the first end portion 21*a* of the end portions 21*a* and 21*b* of the coil layer 21 is covered with the magnetic paste.

Figure 6A:
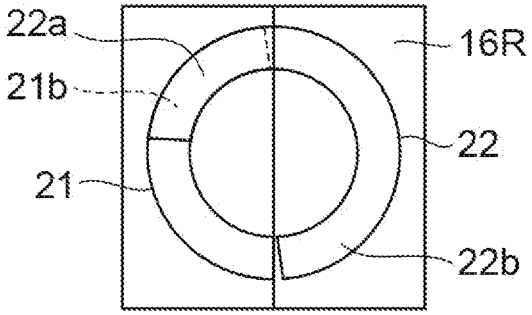
FIGS. 6A to 6D are views showing each step in manufacturing the coil shown in FIG. 4.

Subsequently, as shown in FIG. 6A, the conductive paste to be the coil layer 22 is printed again. The first end portion 22*a* of the coil layer 22 positioned on the left half surface overlaps and is joined to the second end portion 21*b* of the coil layer 21 exposed from the magnetic layer 16R. The second end portion 22*b* of the coil layer 22 located on the right half surface is provided on the magnetic layer 16R. Therefore, the first end portion 22*a* and the second end portion 22*b* of the coil layer 22 are at different height positions in the stacking direction of the element body 12. More specifically, the second end portion 22*b* is located closer to the end surface 12*a* (closer to the viewer of FIGS. 6A to 6D) than the first end portion 22*a*.

Figure 6B:
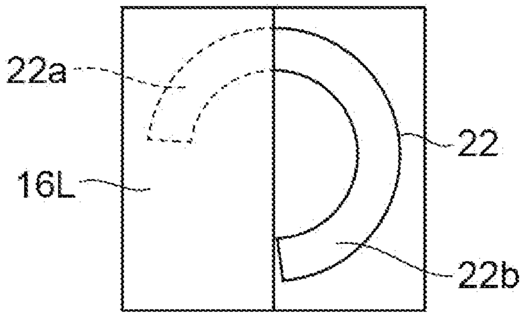

Then, as shown in FIG. 6B, the magnetic paste for forming the magnetic layer 16L is printed again on the left half surface. Accordingly, only the first end portion 22*a* of the end portions 22*a* and 22*b* of the coil layer 22 is covered with the magnetic paste.

Figure 6C:
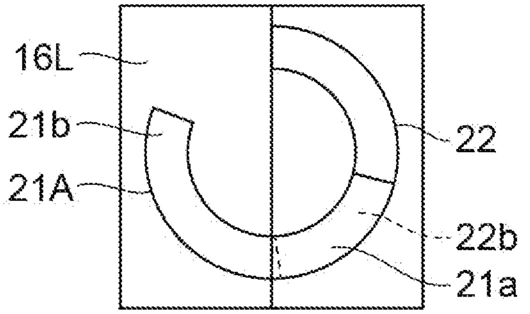

Further, as shown in FIG. 6C, the conductive paste to be the coil layer 21A is printed. The coil layer 21A has substantially the same configuration as the coil layer 21 described above, and is different from the coil layer 21 only in the position of the second end portion 21*b*. The position of the second end portion 21*b* of the coil layer 21A is adjusted for connection with the lead conductor 30 described later. The second end portion 21*b* of the coil layer 21A is located substantially in the middle of the left half surface (substantially in the middle in the vertical direction in FIG. 6C). The first end portion 21*a* of the coil layer 21A overlaps and is joined to the second end portion 22*b* of the coil layer 22 exposed from the magnetic layer 16L. The second end portion 21*b* of the coil layer 21A is provided on the magnetic layer 16L. In the coil layer 21A, similarly to the coil layer 21, the first end portion 21*a* and the second end portion 21*b* are located at different height positions in the stacking direction of the element body 12.

Figure 6D:
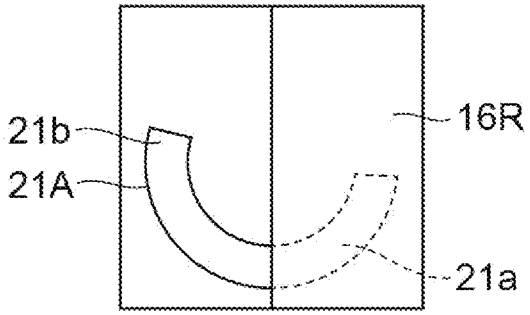

Thereafter, as shown in FIG. 6D, the magnetic paste to be the magnetic layer 16R is printed again on the right half surface. Accordingly, only the first end portion 21*a* of the end portions 21*a* and 21*b* of the coil layer 21A is covered with the magnetic paste.

One turn of the coil 20 is formed by the print stacking of the coil layer 21 of FIG. 5C, the magnetic layer 16R of FIG. 5D, the coil layer 22 of FIG. 6A, and the magnetic layer 16L of FIG. 6B. By setting these as one set and repeating a plurality of sets, the coil 20 constituted by the plurality of turns is formed.

As shown in FIG. 3, the pair of lead conductors 30 are provided between the coil 20 and the end surfaces 12*a* and 12*b* of the element body 12, respectively. Each of the lead conductors 30 is electrically connected to the end of the coil 20, and is exposed from the end surfaces 12*a* and 12*b* of the element body 12 to be connected to the external electrodes 14A and 14B. In the present embodiment, the length of the lead conductor 30 in the stacking direction of the element body 12 is 0.15 mm. In the stacking direction of the element body 12, the length of the lead conductor 30 can be designed to be in the range of 5 to 25% of the length of the element body 12.

Figure 7:
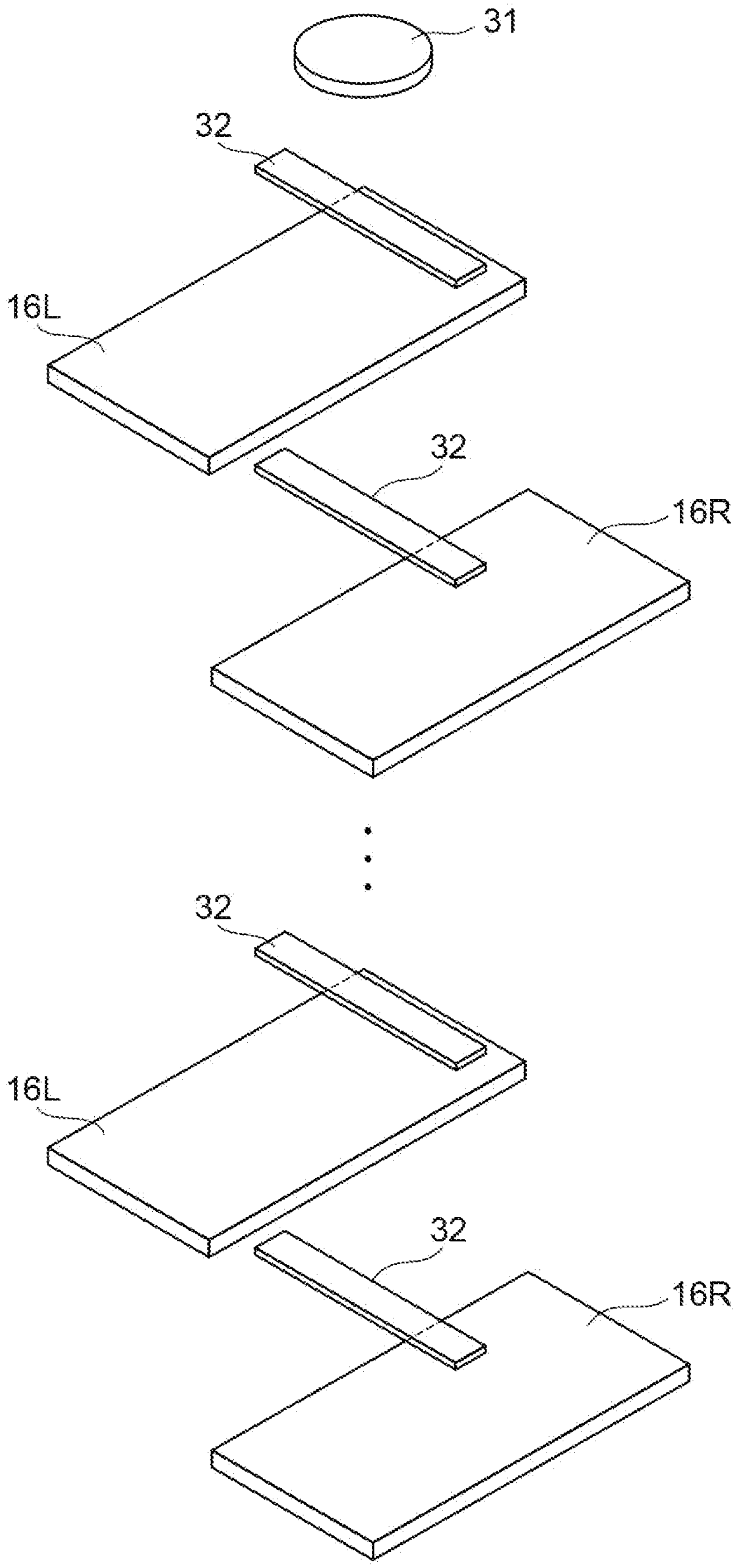
FIG. 7 is a perspective view showing a stacking structure of the lead conductors shown in FIGS. 2 and 3.

FIG. 7 is an exploded perspective view showing the stacking structure of the portion of the lead conductor 30 of the element body 12. As shown in FIG. 7, the lead conductor 30 includes an exposed layer 31 exposed from the end surfaces 12*a* and 12*b* and a plurality of lead layers 32, which are stacked. The exposed layer 31 and the lead layer 32 constituting each of the lead conductors 30 are made of a conductive material containing a metal such as Ag. Each of the lead conductor 30 is formed by a printing method similarly to the coil 20. Specifically, each of the lead conductors 30 is obtained by applying a conductive paste (for example, Ag paste) to be the exposed layer 31 and the lead layer 32 onto a magnetic paste to be the magnetic layers 16L and 16R and sintering the conductive paste. The thickness of each of the exposed layer 31 and the lead layer 32 is, for example, 20 μm.

In the portion of the lead conductor 30 of the internal conductor 18, the lead layers 32 constituting the lead conductor 30 and the magnetic layers 16L and 16R constituting the element body 12 are alternately stacked. The exposed layer 31 is provided on the uppermost lead layer 32.

The exposed layer 31 has a circular shape when viewed from the stacking direction of the element body 12, and is located on the coil axis Z of the coil 20. Each of the lead layers 32 has an I-shape when viewed from the stacking direction of the element body 12, and is located on the coil axis Z of the coil 20. In this embodiment, the lead layers 32 have the same dimensions. The plurality of lead layers 32 entirely overlap each other when viewed from the stacking direction of the element body 12. The plurality of lead layers 32 are arranged in the stacking direction of the element body 12, and the adjacent lead layers 32 are joined with the end portions 32*a* and 32*b* overlapping each other.

When viewed from the stacking direction of the element body 12, the area of the exposed layer 31 is designed to be larger than the area of the lead layer 32. In particular, the exposed layer 31 is designed to have a larger area than the uppermost lead layer 32.

FIGS. 8A to 8D and 9A to 9D are views showing a procedure for forming the lead conductor 30 by a printing method.

Figure 8A:
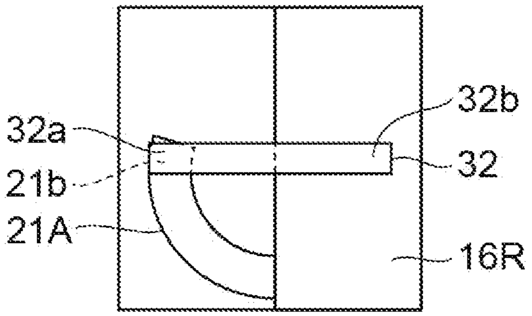
FIGS. 8A to 8D are views showing each step in manufacturing the lead conductor shown in FIG. 7.

First, as shown in FIG. 8A, the conductive paste to be the lead layer 32 is printed on the coil layer 21A shown in FIG. 6D. In FIGS. 8A to 8D and 9A to 9D, the I-shaped lead layer 32 extends in the left-right direction and has a left end portion 32*a* and a right end portion 32*b*. The left end portion 32*a* of the lead layer 32 overlaps and is joined to the second end portion 21*b* of the coil layer 21A exposed from the magnetic layer 16R. The right end portion 32*b* of the lead layer 32 is provided on the magnetic layer 16R. In the lead layer 32, the left end portion 32*a* and the right end portion 32*b* are at different height positions in the stacking direction of the element body 12. More specifically, the right end portion 32*b* is located closer to the end surface 12*a* (closer to the viewer of FIGS. 8A to 8D) than the left end portion 32*a*.

Figure 8B:
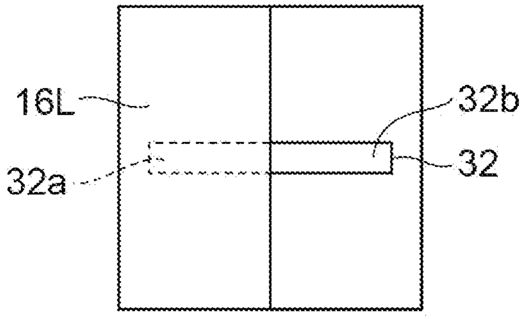

Next, as shown in FIG. 8B, the magnetic paste for forming the magnetic layer 16L is printed on the left half surface. Accordingly, only the left end portion 32*a* of the end portions 32*a* and 32*b* of the lead layer 32 is covered with the magnetic paste.

Figure 8C:
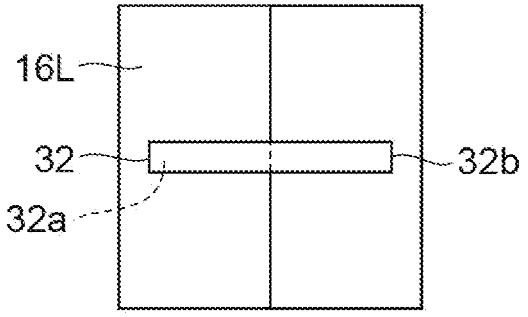

Then, as shown in FIG. 8C, the conductive paste to be the lead layer 32 is printed again. The right end portion 32*b* of the lead layer 32 overlaps and is joined to the right end portion 32*b* of the lead layer 32 exposed from the magnetic layer 16L. The left end portion 32*a* of the lead layer 32 is provided on the magnetic layer 16L. Therefore, the left end portion 32*a* and the right end portion 32*b* of the lead layer 32 are at different height positions in the stacking direction of the element body 12. More specifically, the left end portion 32*a* located on the magnetic layer 16L is located closer to the end surface 12*a* (closer to the viewer of FIGS. 8A to 8D) than the right end portion 32*b*.

Figure 8D:
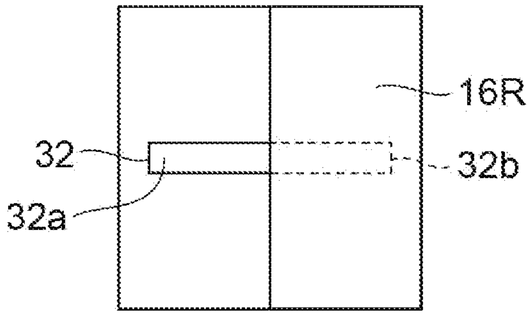

Further, as shown in FIG. 8D, the magnetic paste for forming the magnetic layer 16R is printed on the right half surface. Accordingly, only the right end portion 32*b* of the end portions 32*a* and 32*b* of the lead layer 32 is covered with the magnetic paste.

Figure 9A:
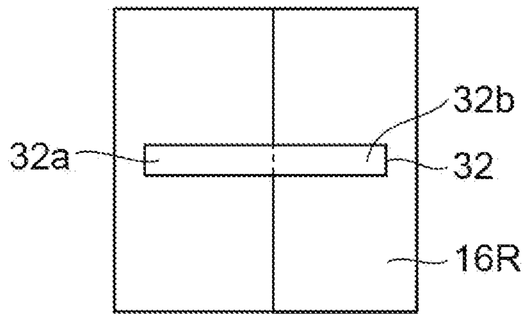
FIGS. 9A to 9D are views showing each step in manufacturing the lead conductor shown in FIG. 7.

Subsequently, as shown in FIG. 9A, the conductive paste to be the lead layer 32 is printed again. The left end portion 32*a* of the lead layer 32 overlaps and is joined to the left end portion 32*a* of the lead layer 32 exposed from the magnetic layer 16R. The right end portion 32*b* of the lead layer 32 is provided on the magnetic layer 16R. Therefore, the right end portion 32*b* located on the magnetic layer 16R is located closer to the end surface 12*a* (closer to the viewer of FIGS. 9A to 9D) than the left end portion 32*a*.

Figure 9B:
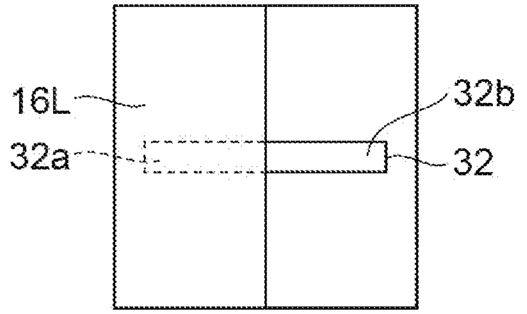

Then, as shown in FIG. 9B, the magnetic paste for forming the magnetic layer 16L is printed again on the left half surface. Accordingly, only the left end portion 32*a* of the end portions 32*a* and 32*b* of the lead layer 32 is covered with the magnetic paste.

Figure 9C:
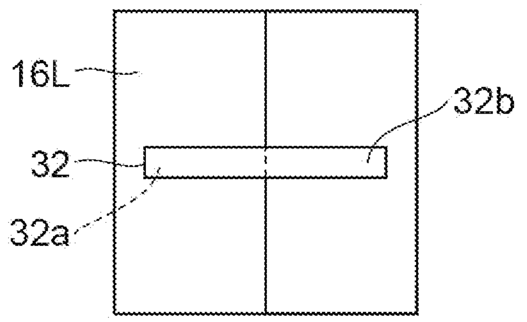

Further, as shown in FIG. 9C, the conductive paste to be the lead layer 32 is printed again. The right end portion 32*b* of the lead layer 32 overlaps and is joined to the right end portion 32*b* of the lead layer 32 exposed from the magnetic layer 16L. The left end portion 32*a* of the lead layer 32 is provided on the magnetic layer 16L. Therefore, the left end portion 32*a* located on the magnetic layer 16L is located closer to the end surface 12*a* (closer to the viewer of FIGS. 9A to 9D) than the right end portion 32*b*.

The pair of lead layers 32 jointed each other is formed by print stacking of the lead layer 32 of FIG. 8C, the magnetic layer 16R of FIG. 8D, the lead layer 32 of FIG. 9A, and the magnetic layer 16L of FIG. 9B. By setting these as one set and repeating a plurality of sets, it is possible to form the lead conductor 30 including some pairs of the lead layers 32.

Figure 9D:
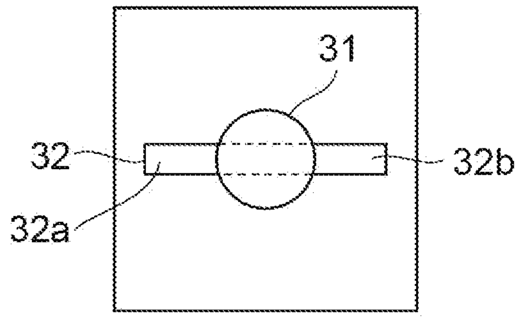

Thereafter, as shown in FIG. 9D, the conductive paste to be the exposed layer 31 is printed. The periphery of the exposed layer 31 may be filled with the magnetic paste.

Figure 10:
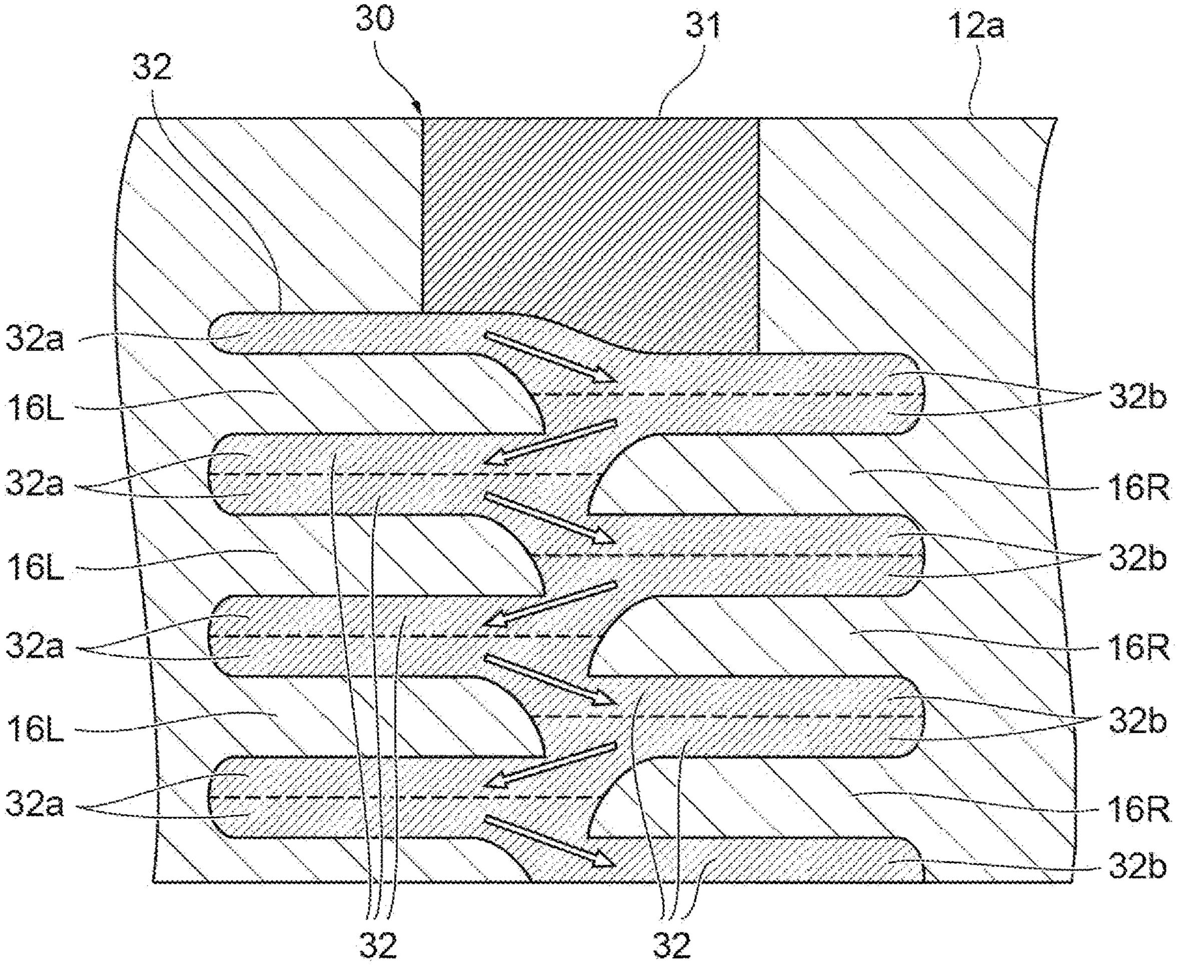
FIG. 10 is a schematic cross-sectional view showing the lead conductor shown in FIG. 7.

FIG. 10 is a cross-sectional view showing the lead conductor 30 exposed at the end surface 12*a* of the element body 12. The lead conductor 30 on the end surface 12*b* of the element body 12 is the same as the lead conductor 30 on the end surface 12*a* of the element body 12, and thus the description thereof is omitted.

As shown in FIG. 10, the plurality of lead layers 32 are interposed between the magnetic layers 16R and the magnetic layers 16L that are alternately stacked. Therefore, the left end portion 32*a* and the right end portion 32*b* of each of the lead layers 32 are at different height positions with respect to the stacking direction of the element body 12, and the plurality of lead layers 32 overlap each other in a zigzag manner. In the lead conductor 30, as indicated by arrows in FIG. 10, the current path is also zigzag. In FIG. 10, the plurality of lead layers 32 are shown to overlap in a bellows shape. The plurality of lead layers 32 may continuously overlap in a Z-shape.

As described above, the multi-layer coil component 10 includes the plurality of stacked magnetic layers 16R and 16L, the element body 12 (sintered element body) having the pair of end surfaces 12*a* and 12*b* facing each other in the first direction parallel to the stacking direction of the plurality of magnetic layers 16R and 16L, the coil 20 provided in the element body 12 and having the coil axis Z parallel to the first direction, and the pair of external electrodes 14A and 14B provided on the end surfaces 12*a* and 20*b* of the element body 12, and the pair of lead conductors 30 each provided between the end portion of the coil 20 and the end surfaces 12*a* and 12*b* of the element body 12, the pair of lead conductors 30 being connected electrically to the end portions of the coil 20 and exposed from the end surfaces 12*a* and 12*b* of the element body 12 to connect to the external electrodes 14A and 14B. Each of the lead conductors 30 includes the plurality of lead layers 32, and each of the lead layers 32 has the left end portion 32*a* and the right end portion 32*b*. The left end portion 32*a* and the right end portion 32*b* are located at different height positions in the first direction, and are displaced from each other when viewed from the first direction. In the lead layers 32 adjacent to each other in the first direction, the end portions 32*a* and 32*b* (second end portions) positioned on the upper side in the stacking direction of one lead layer 32 and the end portions 32*a* and 32*b* (first end portions) positioned on the lower side in the stacking direction of the other lead layer 32 overlap each other.

In the multi-layer coil component 10, the lead conductor 30 is exposed from the end surfaces 12*a* and 12*b* of the element body 12 and is connected to the external electrodes 14A and 14B provided on the end surfaces 12*a* and 12*b*. In the case where the lead conductors 30 are led out to the end surfaces 12*a* and 12*b* of the element body 12, the lead area can be easily increased compared to the case where the lead conductors are led out to the side surfaces 12*c* to 12*f* of the element body 12. For example, the exposed layer 31 of the lead conductor 30 exposed from the end surfaces 12*a* and 12*b* of the element body 12 can easily increase the area when viewed from the stacking direction of the element body 12 (that is, the lead area), and the area can be increased with respect to the cross-sectional area of the lead layer 32 or the coil layers 21 and 22. Therefore, by connecting the coil 20 and the external electrodes 14A and 14B via the lead conductor 30, high connectivity between the coil 20 and the external electrodes 14A and 14B is achieved.

Figure 11:
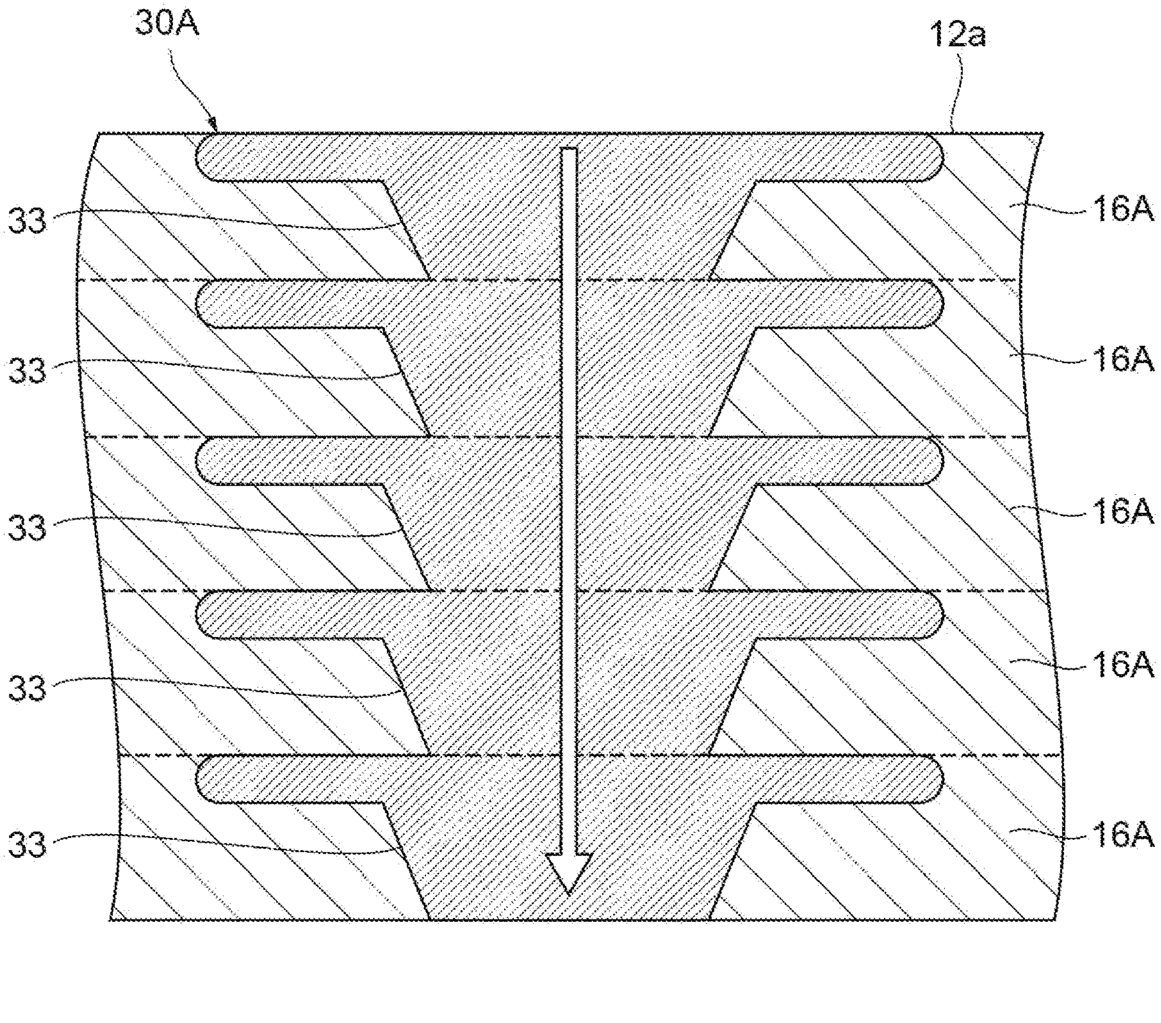
FIG. 11 is a schematic cross-sectional view showing a stacking structure of lead conductors of different forms.
Figure 12:
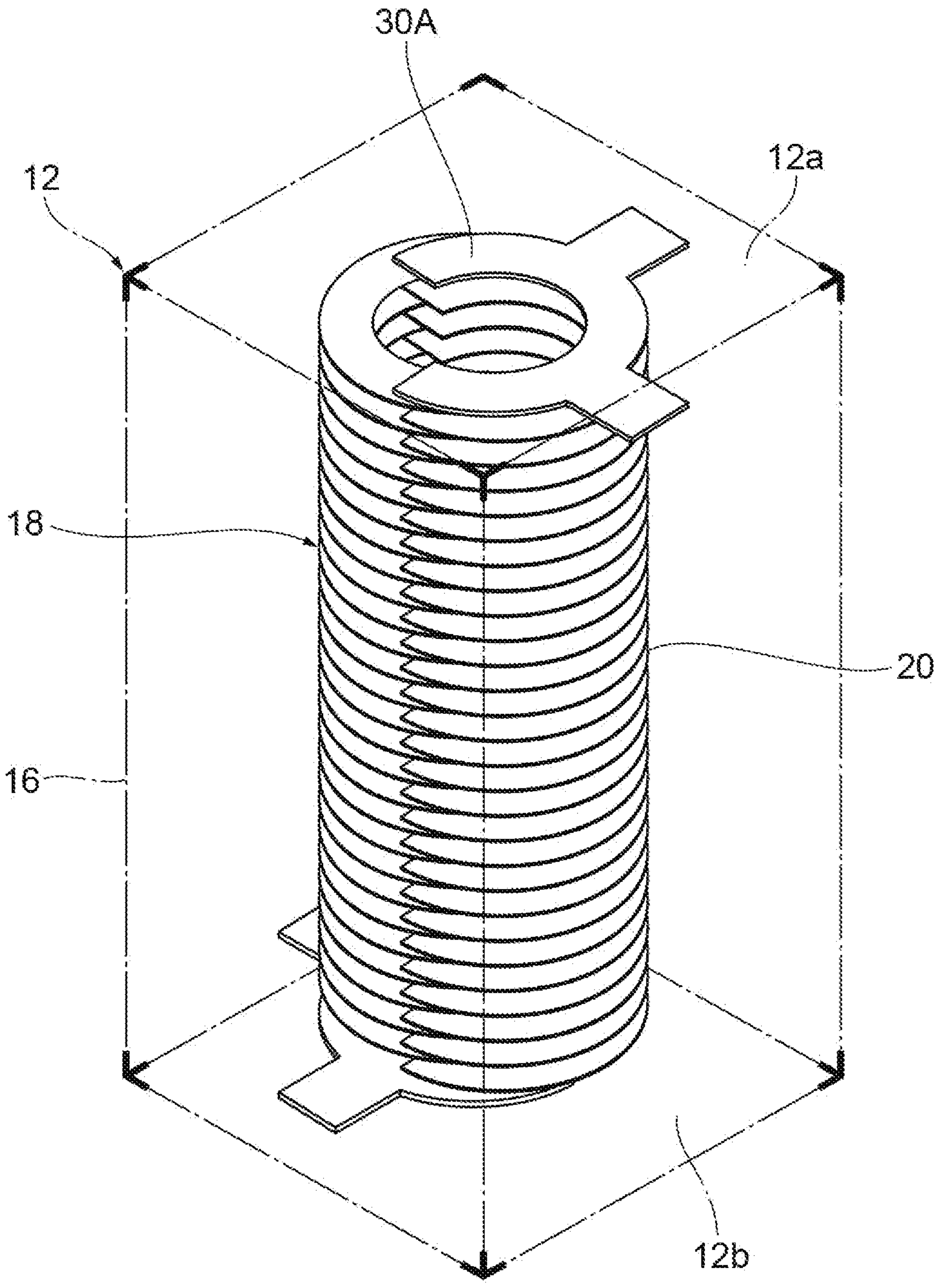
FIG. 12 is a perspective view showing an inner conductor of a multi-layer coil component according to the conventional art.
Figure 13:
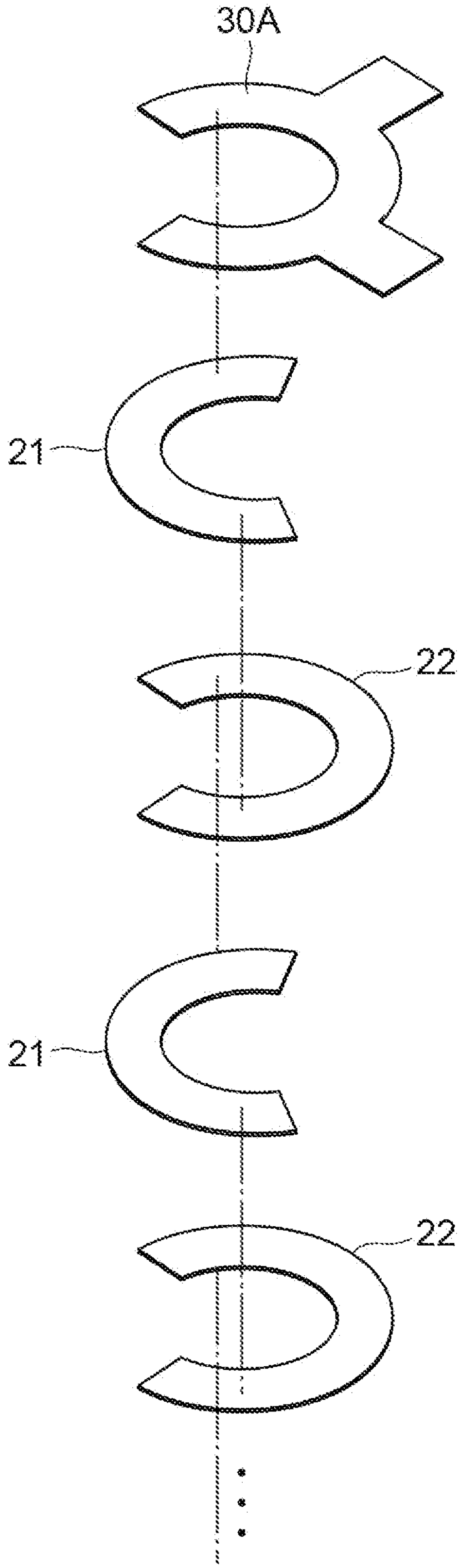
FIG. 13 is a perspective view showing a stacking structure of the coil shown in FIG. 12.

The lead conductor 30 of the multi-layer coil component 10 has a reduced electrode volume. For comparison, FIG. 11 shows a lead conductor 30A including a plurality of via conductors 33. Each of the via conductors 33 penetrates each of the magnetic layers 16A constituting the element body 12. The plurality of via conductors 33 are linearly arranged along the stacking direction of the element body 12. In the lead conductor 30A, the current path is also linear as indicated by the arrow in FIG. 11. In the lead conductor 30A shown in FIG. 11, each of the via conductors 33 is provided so as to fill the through hole of the magnetic layer 16A, and thus each via conductor 33 has a relatively large volume. Therefore, the electrode volume of the lead conductor 30A assembled from the plurality of via conductors 33 is increased. In this case, cracks are likely to occur due to the difference in shrinkage between the via conductor 33 and the magnetic layer 16A during sintering. On the other hand, the lead conductor 30 of the multi-layer coil component 10 has a relatively small volume because the lead layer 32 does not penetrate the magnetic layers 16R and 16L. Therefore, cracks are prevented in the multi-layer coil component 10.

In the multi-layer coil component 10, the lengths of the lead conductors 30 in the first direction are designed to be 5% or more of the lengths of the element body 12 in the first direction and to be equal to or less than the inner diameter of the coil 20.

Furthermore, in the multi-layer coil component 10, the lead conductor 30 includes the exposed layer 31 (first lead layer) exposed at the end surfaces 12*a* and 12*b* of the element body 12 and the uppermost lead layer 32 (second lead layer) overlapping the exposed layer 31 on the coil 20 side, and the area of the exposed layer 31 when viewed from the first direction is designed to be larger than the area of the uppermost lead layer 32.

Although the embodiments of the present disclosure have been described above, the present disclosure is not necessarily limited to the above-described embodiments, and various modifications can be made without departing from the gist thereof. For example, the exposed layer 31 of the lead conductor 30 is not limited to one layer, and may be formed of a plurality of layers. The lead conductor 30 may include a plurality of lead layers 32 without including the exposed layer 31. The number of the pair of the lead layers 32 of the lead conductor 30 may be one or more. The coil 20 may have a circular ring shape, a rectangular ring shape, or an elliptical ring shape when viewed from the stacking direction of the element body 12.

What is claimed is:

1. A multi-layer coil component comprising:

a sintered element body including a plurality of stacked layers and having a pair of end surfaces including a first end surface and a second end surface facing each other in a first direction parallel to a stacking direction of the plurality of layers;

a coil provided in the sintered element body and having a coil axis parallel to the first direction, the coil having end portions;

a pair of external electrodes respectively provided on the end surfaces of the sintered element body; and, a pair of lead conductors each provided between one of the end portions of the coil and one of the end surfaces of the sintered element body, the pair of lead conductors being connected electrically to the end portions of the coil and exposed from the end surfaces of the sintered element body to connect to the external electrodes, wherein the pair of lead conductors includes a first lead conductor that includes a plurality of lead layers each having a first end portion and a second end portion located closer to the first end surface side than the first end portion and displaced from the first end portion when viewed from the first direction, the plurality of lead layers is overlapped in the first direction, wherein, in the lead layers adjacent to each other in the first direction, the first end portion of one lead layer and the second end portion of the other lead layer overlap each other, and wherein the first lead conductor includes a first lead layer exposed at the first end surface of the sintered element body and a second lead layer overlapping the first lead layer on the coil side, and an area of the first lead layer when viewed from the first direction is larger than an area of the second lead layer.

2. The multi-layer coil component according to claim 1, wherein each of the plurality of lead layers has an I-shape when viewed from the first direction, the plurality of lead layers is overlapped in a zigzag manner.

3. The multi-layer coil component according to claim 1, wherein a length of the first lead conductor in the first direction is 5% or more of a length of the sintered element body in the first direction and is equal to or less than an inner diameter of the coil.

4. The multi-layer coil component according to claim 1, the sintered element body has a print stacking structure.

* * * * *